No. 652,436. Patented June 26, 1900.
J. MATTHIAS.
THERMO ELECTRIC BATTERY OR PILE.
(Application filed June 19, 1899.)
(No Model.)
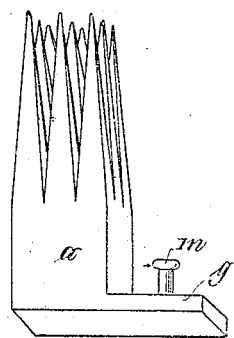
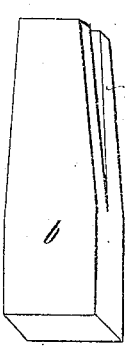
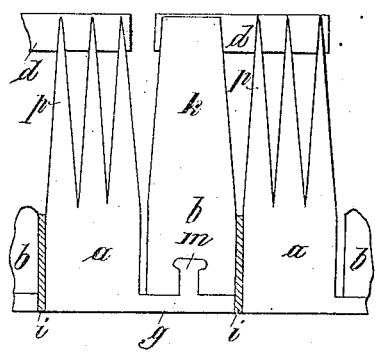
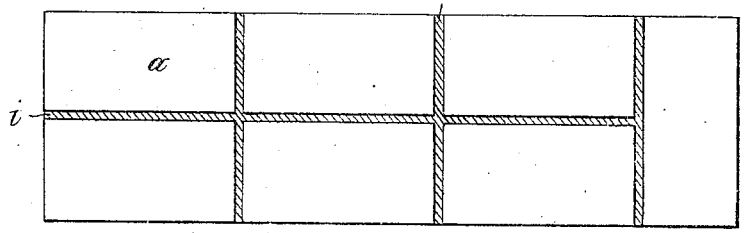
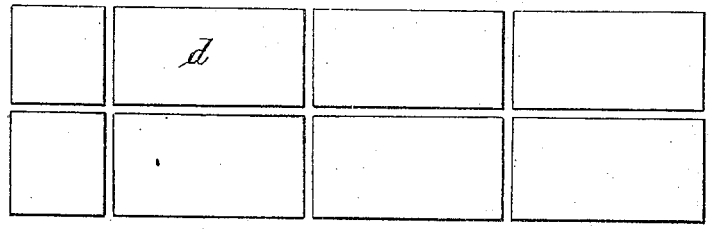

UNITED STATES PATENT OFFICE.

JOSEPH MATTHIAS, OF STUTTGART, GERMANY.

THERMO-ELECTRIC BATTERY OR PILE.

SPECIFICATION forming part of Letters Patent No. 652,436, dated June 26, 1900.

Application filed June 19, 1899. Serial No. 721,125. (No model.)

*To all whom it may concern:*

Be it known that I, JOSEPH MATTHIAS, telegraph secretary, of 55 Gymnasiumsstrasse, Stuttgart, in the German Empire, have invented certain new and useful Improvements in Thermo-Electrical Batteries or Piles, of which the following is a specification.

In thermo-electric batteries or piles every element or cell is composed, as is well known, of two different metals or metallic alloys. If these are chosen so that they are able to produce the greatest possible electrical action, they being therefore as widely separated as possible in the electric tensile series, the physical properties of the metals or metallic alloys will then differ relatively more from one another than in the case where only a slight action is produced and the metals in question are situated nearer together in the electrical tensile series. If, for instance, there is taken for the composition of the electrodes on one side German silver and on the other side an alloy composed of two parts of antimony and one part of zinc, a greater electrical action is obtained; but the fact has to be considered that while the first electrode is hard the second has the disadvantage of greater fragility. This extreme fragility or liability to fracture has hitherto hindered the general application of such alloys to thermo-electrical purposes, however much it may have been desired to make use of their high electromotive power. If, besides this, (as in the case of the electrodes described in the following description,) their special form is such as to increase their liability to be broken, their application would be absolutely impossible unless special protective means are employed.

The present invention consists of an improvement in thermo-electrical batteries or piles by which great firmness or support is imparted to the fragile electrode, thereby permitting an unlimited application and durability of the elements and at the same time reducing the resistance to a minimum by reason of the special form, arrangement, and connection of the electrodes, uniting the separate elements in very large numbers in a relatively-small space and permitting an intense cooling action being applied to the side of the electrode farthest from the source of heat.

In the accompanying drawings, Figure 1 is a perspective view of the hard electrode; Fig. 2, a similar view of the fragile electrode; Fig. 3, a vertical section through a part of the battery; Fig. 4, a view of the battery from below, and Fig. 5 a view of the battery from above.

The separate electrodes have in their outer configuration the form of prisms and are placed side by side. The two electrodes of an element differ, however, in form from one another in so far that the electrode $a$, composed of hard metal, has a projection $g$ on the side which is to be turned toward the source of heat, the size of which projection exactly corresponds with the bottom surface of the electrode $b$, composed of fragile metal, this electrode being as much shorter than the hard electrode $a$ as the projection $g$ is thick, so that the hard electrode is as long as $g$ and $b$ together. The sides of the electrode $a$ which are turned to the source of heat are preferably arranged so that their surfaces will be of such a size as to completely fill up that side of the battery. By this means the elements on that side which is turned toward the source of heat offer no spaces by which the hot air might pass to the other side. In the figures the form of a rectangle is shown as an example, the length of which is twice as long as the width, while the electrode $a$ above the projection $g$ is square in cross-section, as is also the lower part of the electrode $b$. This lower part of each of the electrodes, disregarding the projection $g$, has approximately the form of a cube. The upper part of the electrode $a$ is formed into a large number—say nine—of tapering points $p$, while the fragile electrode $b$ is preferably formed into two wedge-shaped projections $k$. The object of forming the electrodes into these tapering points is to enable the electrode to be subjected in close contact as much as possible to the circulation of cool air, whereby the difference of temperature between the electrodes is increased. By thus forming the electrode the resistance of each separate element may also be reduced as desired.

The connection between the electrodes $a$ and $b$ of an element is made by casting the metal of the fragile electrode upon the hard one, the projection $g$ of the latter being provided with a hard-metal knob $m$, which, before the electrode $b$ is cast upon it, is covered with the thinnest possible layer of solder. A close connection of the electrodes $a$ and $b$ is thus effected, and a firm support for the latter is also provided.

The connection of the electrodes of the adjoining elements with one another is effected by means of strong bridge-pieces $d$ made of good conducting metal difficult to melt. This bridge-piece is made as follows: The pointed ends of both electrodes are covered for about ten millimeters with the thinnest possible layer of solder, and the connecting bridge-piece is then cast over them, a close connection of the bridge with the ends of the electrodes being thereby established and the resistance to the current permanently reduced to a minimum. The elements are separated from one another by insulating layers $i$. By this arrangement the fragile electrode $b$ comes between the strong parts of the projection $g$ and the bridge $d$ and is therefore entirely protected both above and below and has a continuous and extremely-firm support. The easily-melted metal of the fragile electrode is protected from too great a heat by the hard base projection.

Having now particularly described and ascertained the nature of the said invention and in what manner the same is to be performed, I declare that what I claim is—

1. In thermo-electric batteries or piles the combination of two solid staff-shaped electrodes in each element, one of them resting on a projection of the other, essentially as described.

2. In thermo-electrical batteries or piles the combination of a strong metallic bridge-piece connecting two adjoining elements with the forked ends of the electrodes.

In witness whereof I have hereunto set my hand in presence of two witnesses.

JOSEPH MATTHIAS.

Witnesses:
A. BAUER,
HERMAN WAGNER.